April 6, 1943.   F. V. MAYO ET AL   2,315,805
FLUID METER
Filed May 15, 1940
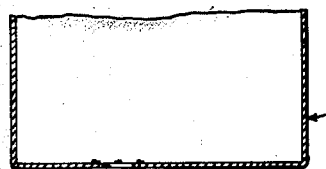
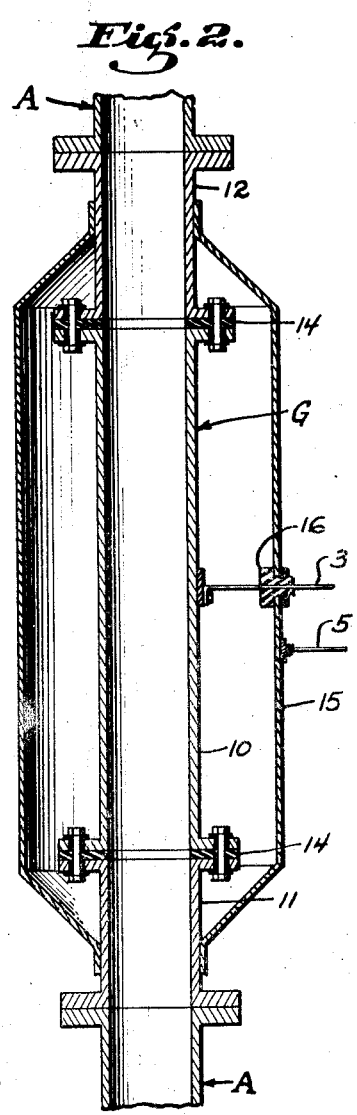
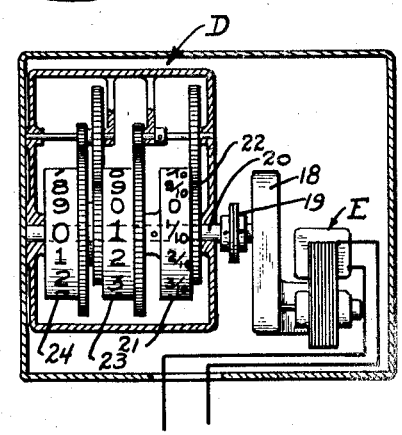
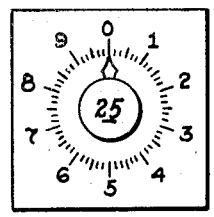
INVENTORS.
Frank V. Mayo,
William H. Misson.
BY
Chas. E. Townsend
ATTORNEY.

Patented Apr. 6, 1943

2,315,805

UNITED STATES PATENT OFFICE 2,315,805

FLUID METER

Frank V. Mayo, Stockton, and William H. Misson, Los Altos, Calif.

Application May 15, 1940, Serial No. 335,296

5 Claims. (Cl. 73—194)

This invention relates to an apparatus for electrical operation of suitable recording or measuring mechanism, through the medium of a flowing liquid, and pertains particularly to the metering and/or computing of the cost of a flowing liquid, like gasoline, as dispensed at service stations.

Present measurement of a flow of liquid through pipes is usually accomplished by measurement of a physical quantity, such as pressure, volume, and weight. This invention deals with flow measurements obtained by measuring the electric voltage or current produced by the flow of the liquid to be measured through suitable apparatus, to be described.

It is known that certain liquids, such as gasoline, oils used in paints, etc., when being poured from one container to another, will under certain conditions produce a voltage between the containers. This voltage may be considerable, as demonstrated by the fact that unless precautions are taken this voltage is often sufficiently high to produce an electrical discharge which has been known to ignite inflammable mixtures and cause severe explosions and fires.

The present invention is based on the discovery that if gasoline or a similar liquid is flowing through a pipe or conduit, and if a section of the conduit is made of metal and insulated from the remaining portion of the conduit, a voltage or current is developed in the insulated metal section. In addition thereto, the invention further embodies means whereby this current may be collected and discharged through equipment which converts it into a pulsating or alternating type of current, which may be utilized to actuate recording apparatus of different types, for instance, to meter the flow of a liquid, or to compute the cost thereof, or both.

One form of apparatus which may be employed is shown by way of illustration in the accompanying drawing, in which—

Fig. 1 is a diagrammatic view of the apparatus;

Fig. 2 is an enlarged vertical section of the current generating section of the conduit;

Fig. 3 shows one form of registering instrument which may be employed; and

Fig. 4 is a front view of a housing containing a variable condenser.

Referring to the drawing in detail, and particularly to Fig. 1, A indicates a conduit in the form of a pipe or the like, and B a tank or other source of liquid supply furnishing liquid to the conduit. Introduced in the conduit, and insulated therefrom, is a section G which will hereinafter be referred to as an electric current generator.

Disposed at any convenient point is a storage capacity or variable condenser 2, one terminal of which is connected through a wire 3 and a resistance 4 with the generator G, while the opposite terminal is connected with the pipeline A or ground through wires 5 and 6.

A flow of liquid through the insulated section G of the conduit generates a voltage which is impressed on the terminals of the storage capacity 2, which accumulates an electric charge in accordance with the equation $Q=CE$, where $Q$ is the quantity of electricity stored in the condenser, $C$ the electric capacity of the condenser, and $E$ the applied voltage. It is evident from the equation that the voltage across the terminals of the condenser will build up as the quantity of electricity stored in the condenser is increased, or: $E=Q/C$, $C$ being a constant. In the present apparatus the voltage across the terminals of the condenser is allowed to build up to a predetermined point, at which point or value the condenser is discharged through suitable auxiliary equipment which will indicate the number of such discharges.

One method of discharging the condenser 2 at a predetermined voltage is to provide a gaseous discharge tube such as a neon lamp 7, which is bridged across the terminals of the condenser. It is well known that current will not flow through a gas-filled lamp or tube until a critical voltage is reached, sufficiently high to ionize the gas in the tube. When this critical voltage is reached, a large current flows until the voltage across the condenser drops to the extinguishing value of the gaseous tube. Both the ionizing and extinguishing values of a given gas-filled tube are critical within narrow limits, and can be reproduced accurately.

When gas is so ionized and current builds up and decays as above described, a series of discharges will result, thereby producing a pulsating current, and by passing this current through the primary 8 of a transformer, an alternating current is set up in the secondary side 9 thereof, the frequency of which will depend upon the rate of flow of the liquid and the capacity of the condenser; hence if the terminals of the secondary of the transformer are connected to a registering instrument such as indicated at D, the pulsating or alternating current produced may be translated to meter the flow of the liquid, compute its cost or value, etc.

One form of current generator which may be employed is shown in Fig. 2. It consists of a metal tube 10 of suitable length and diameter, depending upon the volume and velocity of the liquid passing therethrough. This tube is flanged at opposite ends and is bolted to conduit sections indicated at 11 and 12, but the tube is insulated therefrom by insulating gaskets 14 or other suitable means. Also, an external housing 15 is provided to exclude atmospheric moisture, so as to prevent leakage or dissipation of the current generated. The wire 3 which connects with the condenser 2 passes through the housing 15 and is insulated therefrom by a bushing 16. The generator may obviously be otherwise constructed, but the form shown is suitable as it can be easily inserted or removed from a pipeline or conduit.

From the equation $Q=CE$, it is seen that the quantity of electricity stored in the condenser is a function both of the capacity of the condenser C and of the voltage impressed across its terminals. For a given quantity of electricity generated by the flow of a unit quantity of liquid through the generator G, the number of discharges in the discharge tube 7 will be a function of the electrical capacity of the condenser and the voltage across its terminals.

Advantage has been taken of this fact to provide a variator, for instance the variable condenser 2 shown, that is, a device whereby the number of discharges, and hence the reading of an indicating instrument or meter for a given quantity of flow of liquid, can be varied at will in accordance with some change in unit of measurement, such as a change in price per gallon of liquid dispensed. Variation in the number of discharges can also be accomplished by variations in pressure in the gas contained in the tube, or by changes in the geometry of the elements of the tube.

In the present instance a calibrated dial 25 is used in conjunction with the condenser (see Fig. 4). When there is a voltage generated at G, which is a function of the flow of liquid through the conduit A, the voltage applied across the terminals of the condenser, regulated by the resistance 4, builds up a charge in the condenser in accordance with the formula previously referred to; when the quantity of electricity in the condenser or variator is such that the voltage across its terminals has reached the ionization voltage of the gaseous discharge tube 7, the current will flow in a circuit comprising the condenser, the discharge tube, and the primary winding of the transformer, since, as shown, the voltage across the condenser is proportional to the electrical capacity of the condenser. As an example, if the circuit as shown has a given value or capacity, the condenser produces an electrical discharge in the gaseous discharge tube for a given rate of flow of liquid through the generator G, at the rate of 1/10 second intervals. It is evident that by reducing the capacity of the condenser to one half its former value, discharges will be produced through the tube 7 at twice the previous rate, or at 1/20 second intervals. Thus by adjusting the dial or vernier to vary the capacity of the condenser or variator, frequency of the pulsating current may be regulated in accordance with changes in units of measurement, such as changes in unit of price. The pulsating current from the discharge tube passing through the winding 8 of the transformer causes an alternating voltage to appear across the secondary of the transformer, which obviously will have a frequency identical with the frequency of the discharges in tube 7.

Many types of recording instruments may be actuated by the alternating current thus produced. In Fig. 3 a synchronous type of motor is generally indicated at E. Through reduction gearing 18 and a one-way clutch 19, it drives a shaft 20, upon which is secured a registery drum 21 and a gear 22. Also mounted on the shaft 21 are two additional registering drums 23 and 24; they are free on the shaft but are driven through the gear trains shown, the gear ratio being such that for every revolution of shaft 20 and drum 21, drum 23 will be driven 1/10 of a revolution, and when this has completed one revolution, drum 24 will revolve 1/10 of a revolution. Such a driving arrangement of drums is standard and common practice, and is merely disclosed for purposes of illustration. Suffice it to say that if the instrument is to be employed as a meter to measure the volume of liquid passing through the conduit A, the first drum may have numerals displayed thereon which indicate tenths of a gallon; the drum 23, numerals indicating gallons; and the drum 24, 10-gallon units and up. On the other hand, if it is to indicate the price at which the liquid is to be sold, the first drum may be graduated to indicate fractional cents; the second drum, units of cents; and the third drum, multiples of ten cents, etc.

The variable condenser has herein been referred to as a "variator." It is important for the purpose of calibration, when required, and it is also of great importance when it is considered that the price of a liquid such as gasoline may be changed from time to time. For instance, gasoline may be selling today for 18 cents per gallon, and next week for 20 cents per gallon. By changing the capacity of the variable condenser, frequency of the pulsating current is changed, being increased when the price change is upwardly, and decreased when the price change is downwardly, the dial in the variable condenser being graduated accordingly.

The general circuit shown in Fig. 1 may be changed considerably to suit the varying conditions. For instance, it may be desired to amplify the current produced by the generator by the introduction into the circuit of a transformer such as shown, or any other suitable means, but as such increase of current is common practice, illustration thereof is thought unnecessary.

While certain features of our invention have been more or less specifically described and illustrated, nevertheless we wish it understood that changes may be resorted to within the scope of the appended claims.

Having thus described and illustrated our invention, what we claim and desire to secure by Letters Patent is:

1. An apparatus for utilizing the flow of a liquid in a conduit to actuate a registering instrument, comprising a section in the conduit insulated from the remainder of the conduit, in which an electric current will be developed by the flow of liquid through the conduit, means for converting said current into a pulsating current, a transformer, means for passing said pulsating current through the transformer to amplify the current and to convert it into an alternating current, a registering mechanism, and current actuated means for actuating the registering mechanism.

2. An apparatus for utilizing the flow of a liquid in a conduit to actuate a registering instrument, comprising a section in the conduit insulated from the remainder of the conduit, in which an electric current will be developed by the flow of liquid through the conduit, a condenser, means for impressing said current on the condenser, a gaseous discharge tube, means for connecting the condenser with the gaseous discharge tube to permit discharge of the condenser therethrough and to convert the current into a pulsating current, a transformer, means connecting said discharge tube with the transformer to amplify the current and to convert the pulsating current to an alternating current, a registering mechanism, and current actuated means for actuating the registering mechanism.

3. An apparatus for utilizing the flow of a liquid in a conduit to actuate a registering instrument, comprising a section in a conduit, insulated from the remainder of the conduit, in which an electric current will be developed by the flow of liquid through the conduit, a condenser, means for impressing said current on the condenser, a gaseous discharge tube, means for connecting the condenser with the gaseous discharge tube to permit discharge of the condenser therethrough and to convert the current into a pulsating current, means for varying the capacity of the condenser to increase or decrease the frequency of the discharges through the discharge tube, a transformer, means for connecting the discharge tube with the transformer to amplify and to convert the pulsating current into alternating current, a registering mechanism, and current actuated means for actuating the registering mechanism.

4 An apparatus for utilizing the flow of a liquid in a conduit to develop an electric current and to convert the current into electrical impulses comprising, a section in the conduit insulated from the remainder of the conduit in which an electric current will be developed by the flow of liquid through the conduit, a condenser, means for impressing the current on the condenser, a gaseous discharge tube, and means for connecting the condenser with the gaseous discharge tube to permit discharge of the condenser therethrough to convert the current into electrical impulses.

5. An apparatus for utilizing the flow of a liquid in a conduit to develop an electric current and to convert the current into electrical impulses comprising, a section in the conduit insulated from the remainder of the conduit in which an electric current will be developed by the flow of liquid through the conduit, a condenser, means for impressing the current on the condenser, a gaseous discharge tube, means for connecting the condenser with the gaseous discharge tube to permit discharge of the condenser therethrough to convert the current into electrical impulses, and means for varying the capacity of the condenser to increase or decrease the frequency of the discharges through the discharge tube.

FRANK V. MAYO.
WILLIAM H. MISSON.